Sept. 18, 1945. L. H. CROOK 2,384,893
AIRCRAFT
Filed Feb. 19, 1942 2 Sheets-Sheet 1

Inventor
Louis H. Crook
By Attorney

Sept. 18, 1945.  L. H. CROOK  2,384,893
AIRCRAFT
Filed Feb. 19, 1942  2 Sheets-Sheet 2
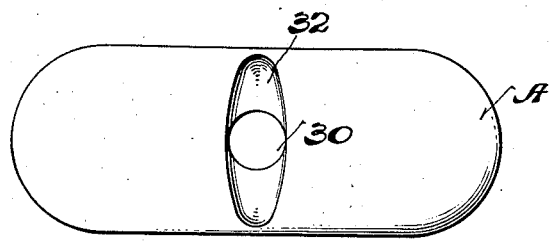
Fig.4.
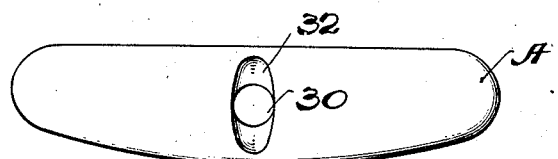
Fig.5.
Fig.6.
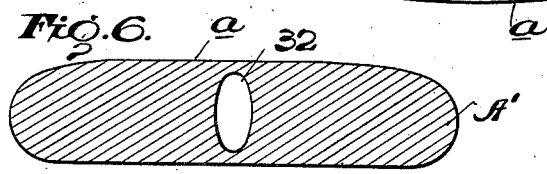
Fig.7.
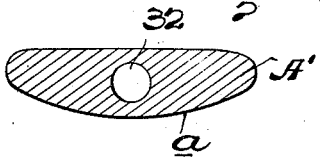
Fig.8.
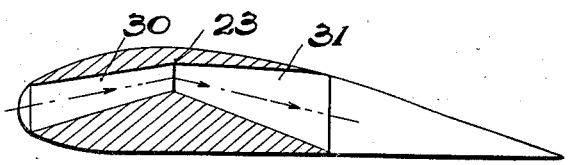
Fig.9.
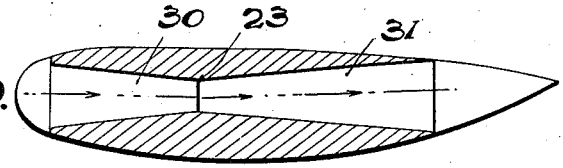
Fig.10.
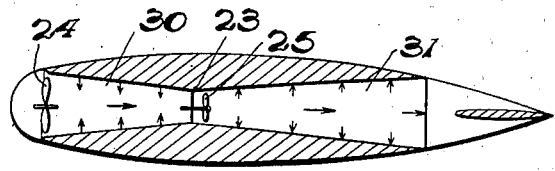
Fig.11. 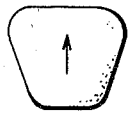  Fig.12. 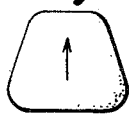  Fig.13.   Fig.14. 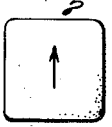
Inventor
Louis H. Crook
By
Attorney Patented Sept. 18, 1945

2,384,893

UNITED STATES PATENT OFFICE 2,384,893

AIRCRAFT

Louis H. Crook, Washington, D. C., assignor to Aerodynamic Research Corporation, Washington, D. C., a corporation of the District of Columbia Application February 19, 1942, Serial No. 431,590

19 Claims. (Cl. 244—73)

This invention relates to certain improvements in aircraft; and the nature and objects of the invention will be readily recognized and understood by those skilled in the arts to which it relates, from the following detailed description and explanation of the accompanying drawings illustrating what I at present consider to be the preferred embodiment or mechanical and aerodynamic expression of my invention from among various other forms, designs, arrangements, constructions and combinations of which the invention is capable within the broad spirit and scope thereof.

The invention is adapted to and capable of embodiment in aircraft generally of the lighter-than-air types and of the heavier-than-air types, as well as to aircraft of compromise types that embody characteristics of both lighter-than-air and heavier-than-air types without being solely or distinctly either of a lighter-than-air type or a heavier-than-air type; and the term "aircraft" is generally used herein and in the appended claims, unless otherwise qualified specifically or by surrounding context, in a broad generic sense to include any aircraft to which the principles of the invention may be adapted and applied.

Airfoils or bodies capable of developing aerodynamic lift when moved through the air, when of low aspect ratio, that is, when such bodies or airfoils in plan form approach the square or circular form with the length approximating the width, develop certain definite aerodynamic characteristics of advantage over airfoils of high aspect ratio, that is, over airfoils which have a width or span several times greater than the length or chord of the airfoil. While the low aspect ratio airfoils may have a lower lift coefficient at small angles of attack than high aspect ratio airfoils, yet they present certain advantageous control characteristics as well as increased stability both static and dynamic over the high aspect ratio airfoils. At large angles of attack and large Reynolds numbers, the square or circular or round airfoils; that is, low aspect ratio airfoils, have a much greater lift coefficient than any other known type of large aspect ratio airfoils.

In addition such airfoils or bodies of low aspect ratio lend themselves peculiarly, both structurally and aerodynamically, to the utilization of propulsion means and methods of what may be aptly termed the thrust augmentation type, such for example as propulsion means of the type in which a propeller or other air impelling and thrust force developing element is mounted and confined within a passage formed extending through the airfoil or body in the direction of flight of the aircraft for displacement of air rearwardly therethrough from the leading edge or forward portion of the airfoil to the trailing edge or rear portion of the airfoil.

One of the aims of my present invention is to provide an aircraft adapted to either the lighter-than-air or heavier-than-air embodying for its primary structure an airfoil or body of low aspect ratio in which the aerodynamic efficiencies and advantages of the low aspect ratio airfoil are efficiently and correctly utilized, and to provide a system and arrangement of stabilizing surfaces and control surfaces for such design of airfoil or body which are in such aerodynamic cooperation and relationship with such low aspect ratio airfoil designed in accordance with the invention in order to produce by such arrangement a design of aircraft that will have a desired degree of stability, both static and dynamic, and which will be effectively controllable in pitch, roll, and yaw under and throughout all conditions of flight.

With aircraft of lighter-than-air types it has been well established that the lift of such a craft is very large in a circular cross section form of airship, and with respect to the adaptations of the principles of my present invention to aircraft of the lighter-than-air types one of the objects of the invention is to advantageously utilize this lift characteristic by the provision of a design which is based upon and embodies the primary structure or body formed of airfoil section having a low aspect ratio approaching the square or circular form in plan to increase the advantageous lift of the usual dirigible and to obtain more effective stability and control characteristics which results in increasing the pay load of a lighter-than-air craft designed in accordance with this invention over the pay load possible to a lighter-than-air craft using the same volume of buoyant gas but having a body or hull design and shape of a conventional form.

With respect to the adaptations of the principles of my present invention to aircraft of the heavier-than-air types, one of the aims and objectives sought by the invention is to provide a design of aircraft embodying a primary structure in the form of an airfoil or body having a low aspect ratio that will utilize and make effective the highly advantageous static and dynamic stability characteristics as well as more favorable control characteristics possible with an airfoil or body of low aspect ratio, as well as to permit the production of larger size heavier-than-air craft without encountering dangerous disadvantages due to the control characteristics, both static and dynamic, that are developed and encountered with attempted larger sizes of heavier-than-air craft of conventional designs based upon and embodying airfoils or lift surfaces with high aspect ratios.

A further characteristic and a feature of the invention that is made possible by the use of a low aspect ratio airfoil or body as the primary structure of the aircraft, resides in the mounting and inclusion of substantially all structure, mechanisms, and loads both operating and pay, within the confines of the airfoil or body, which being of airfoil section and therefore of generally streamlined form, result in the reduction of the drag and other disadvantageous characteristics developed from structure and elements located exteriorly of the airfoil or body and in the airflow about the body.

The design of an airfoil or body based upon the low aspect ratio form and providing the primary structure for an aircraft in accordance with my invention, is peculiarly adapted for efficient utilization of propulsion means and methods of the so-called thrust augmentation types; pressure propulsion, so called jet propulsion or the like, and a further feature of my invention resides in the structural and aerodynamic association and combination of such propulsion means with the airfoil or body design of the invention, which propulsion means preferably embodies a passage extending through the airfoil or body of the aircraft in the direction of flight, that is along or generally parallel to the longitudinal axis of the craft from the forward or leading edge portion of the airfoil to the rear or trailing edge portion thereof, together with means for propelling and displacing air rearwardly through said passage to develop a thrust force for propelling the aircraft, with such propulsion means in such coordinated relation with the stabilizing and control surfaces of the aircraft and of such airfoil or body as to obtain highly effective and advantageous stability and control characteristics as well as maintain more efficient flow of air over the airfoil or body to thereby obtain maximum efficiency of performance for the craft.

Further important features of the invention relate to the thrust augmentation propulsion means with particular reference to the shape and design of the air displacement passage and of the air impelling and thrust force developing elements mounted therein, as well as to the relationship of the airflow or air displacement through such passage with the low aspect ratio airfoil or body and with the stabilizing and control surface system and arrangement for the aircraft as provided in accordance with the teachings of this invention, all in order to obtain a maximum thrust force from a minimum of power and an increased aerodynamic performance for the aircraft.

With the foregoing general aims, objects, and results in view, as well as certain others that will be readily apparent from the following detailed explanation and description, my invention consists in certain novel features in design and arrangement, and in combination and construction of the various elements making up the invention, all as will be more fully and particularly referred to and specified hereinafter.

Referring to the accompanying drawings in which similar reference characters refer to corresponding parts and elements throughout the several figures thereof;

Figure 3:
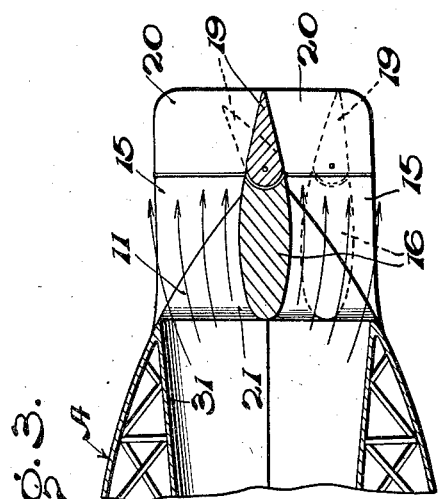
Figure 1:
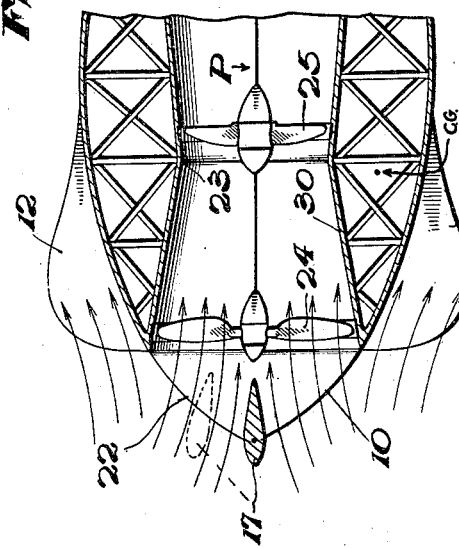
Fig. 1 is a perspective view of an aircraft embodying the principles and features of my invention.
Figure 2:
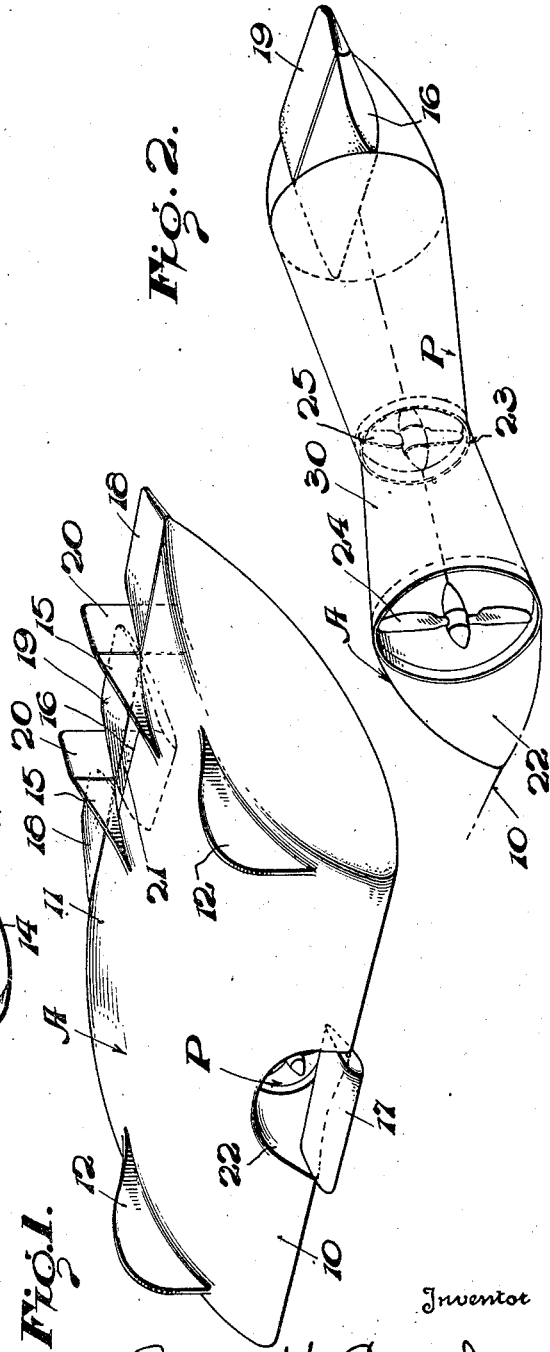
Fig. 2 is a perspective view, more or less diagrammatic, showing the propulsion unit of the invention removed from the aircraft and including the air displacement passage, the arrangements of propellers therein and the relative mounting and arrangement of the fixed horizontal stabilizing surface at the trailing or discharge end of the displacement passage.

Fig. 3 is a view more or less diagrammatic, taken as in vertical longitudinal section through the propulsion unit of Figs. 1 and 2, and particularly showing the action of the airflow at and over the leading and trailing edges of the aircraft body and through the propulsion unit displacement passage and the propellers therein as well as over the fixed and movable stabilizing surfaces at the intake and discharge ends of the displacement passage.

Fig. 4 is a front view in elevation of the forward or leading edge portion of a primary body forming, low aspect ratio airfoil in accordance with my invention, showing the approximate relative proportions of one form of central and vertically elliptical cone-like intake opening or entrance to the thrust augmentation passage or chamber in the airfoil.

Fig. 5 is a front view in elevation similar to Fig. 4 showing a modified form of low aspect ratio airfoil having a lateral cross section camber or contour designed for lateral stability; the same design and form of central and vertically elliptical cone-like intake or forward entrance to the thrust augmentation passage through the airfoil being shown in relative proportions to the airfoil, as the intake or forward entrance shown in Fig. 4.

Fig. 6 is a spanwise cross sectional view through the symmetrical type of body forming airfoil of Fig. 4 taken in a vertical plane approximately midway of the leading and trailing edges and showing the decreased or reduced diameter of the thrust augmentation passage in the airfoil at such location.

Fig. 7 is a spanwise cross sectional view through the laterally cambered primary body forming airfoil of Fig. 5 taken in a vertical plane approximately midway between the leading and trailing edges and showing the reduced diameter of the thrust augmentation passage at such location in the airfoil.

Fig. 8 is a more or less diagrammatic view in vertical cross section taken chordwise through an airfoil section having a substantially flat lower surface and a cambered upper surface, with a design and arrangement of thrust augmentation passage or chambers extending chordwise therethrough from the leading edge to the trailing edge of the airfoil in accordance with the principles of my invention.

Fig. 9 is a more or less diagrammatic view in vertical cross section chordwise of an airfoil section having a substantially flat and uncambered upper surface with a cambered lower or undersurface for increasing longitudinal stability of the airfoil, showing an arrangement and formation of the thrust augmentation passage through an airfoil of such design and contour.

Fig. 10 is a more or less diagrammatical view similar to Figs. 8 and 9 but showing a symmetrical airfoil having a cambered upper surface and a cambered lower or undersurface, with the thrust augmentation passage through the airfoil formed by the forward and rear cone-like chambers more or less schematically illustrated, and having the negative and positive pressure arrows applied along the walls or surfaces of the passage to indicate the pressure conditions through the passage.

Figs. 11, 12, 13 and 14, are more or less diagrammatic outline views in top plan showing typical plan form shapes of low aspect ratio airfoils, particularly adapted to embody the principles and features of my present invention.

In accordance with the principles of my invention an aircraft, whether of the lighter-than-air or of the heavier-than-air types, referring now to the accompanying drawings, basically embodies a wing airfoil or body A that is of low aspect ratio and which forms and provides the primary structure for the aircraft. This primary structure forming a low aspect ratio wing or body A, due to the aspect ratio thereof, inherently possesses and is endowed with the advantageous characteristics both aerodynamically and structurally resulting from airfoils or wings of the low aspect ratio form. While an aircraft of the invention may be of either the lighter-than-air or the heavier-than-air type, the example of aircraft of the invention disclosed in the accompanying drawings may be taken to be of the heavier-than-air type.

With the basically inherent aerodynamic and control advantages of low aspect ratio airfoils or wings, I have developed by the present invention a design and form of airfoil or wing that provides the primary structure or body for the aircraft and which wing forming primary structure efficiently utilizes such advantages and increased efficiency of results, by employing low aspect ratios of a range of the order of approximately from 1 to 1.27, with a thickness factor for the airfoil or wing that will vary in accordance with whether the airfoil or wing is to form the primary structure for a lighter-than-air craft or a heavier-than-air craft, and which thickness factor will also in either case vary in accordance with the size of the airfoil or wing. The thickness of the airfoil or wing is further controlled by the size of the intake and exit cones forming the air displacement passage being hereinafter fully described and explained. As illustrative of the possible range of airfoil or wing thickness relative to the fore and aft length or chord of the airfoil or wing, I now consider that such thickness factor should be within the range of an order of approximately 12% to 30% of the length or chord of the airfoil or wing.

By utilizing a low aspect ratio for the airfoil or wing in the range of the order of approximately 1 to 1.27, I have designed an airfoil or wing, such as the airfoil or wing A of Fig. 1, that approximates or approaches the square or circular plan form, which I have found to be the form in which the advantageous aerodynamic and control characteristics are developed in their highest degrees. While the preferred ranges of aspect ratio of 1 to 1.27 are considered to give the most efficient results, I do not wish to limit my invention to this exact range in every instance because of the varying conditions that will be encountered in specific aerodynamic or structural designs to obtain a certain specific performance to meet particular requirements for which such a design may have been developed, and to meet which an aspect ratio outside of the preferred range may be utilized while still essentially taking advantage of the principles of the invention hereof.

The wing or body A having a low aspect ratio to give it a plan form approximating or approaching the square or circular plan, and a thickness within the ranges of the order hereinbefore referred to, is of airfoil section having a relatively thick forward or leading edge portion 10 with the upper and lower surfaces cambered to join rearwardly in the trailing edge portion 11 of considerably less thickness than the leading edge portion 10 of the wing. Preferably with the heavier-than-air form of wing or body A the camber of the lower surface of the wing is greater than the camber of the upper surface, although it is not intended or desired to limit the airfoils or wings of my invention in every instance to such relative upper and lower surface cambers.

The wing or body A of the design and form of my invention thus provides an interior space within which to locate and house substantially all structure and mechanisms, as well as all loads, with the exception of external control and stabilizing surfaces, so that a craft is provided having minimum drag and materially increased performance relative to pay load requirements. Preferably, with the heavier-than-air type of craft for which the wing or body A forms a primary structure of the present example, the center of gravity of the craft is located at a low point on the wing or body A along the longitudinal or fore and aft axis and approximately at a point 30% of the chord or fore and aft length of the wing from the leading edge thereof. The low aspect ratio wing or body A forming, as above described, the primary structure of the aircraft, be it of the heavier-than-air type as in the example of the accompanying drawings, or of the lighter-than-air type, may be made of any suitable material or materials and in accordance with any desired or known type of construction suitable to the needs of the particular design of aircraft, and the specific construction or particular materials employed form no part of my present invention.

The wing or body A which forms the primary structure for the aircraft has certain inherent stability characteristics, but I have established that a wing forming an aircraft body and having the aspect ratio and thickness factors of my design, can be effectively stabilized in roll by an arrangement of vertical stabilizing fins such as shown in Fig. 1 and which arrangement includes the vertical stabilizing fins 12 of considerable area relative to the wing A, extending upwardly from the upper surface of the wing at opposite sides and adjacent the opposite ends, respectively, of the wing A at the forward or leading edge portion thereof; and similar spaced vertical stabilizing surfaces 14 (see Fig. 3) depending or extending downwardly from the lower surfaces of the wing or body A at opposite sides of the wing, respectively, and preferably in the same vertical plane as the stabilizing fins 12 thereabove. By this arrangement of vertical stabilizing fins effective stability in roll is obtained for the aircraft and this effectiveness is particularly increased by the arrangement and aerodynamic cooperation of these stabilizing fins with the arrangement of yaw or directional stabilizing fins or surfaces 15.

The arrangement of directional stabilizing fins 15 of the present example consists of two of such fins located in parallel spaced relation spaced equidistant from the longitudinal axis of the wing or body A at the rear or trailing portion thereof. The stabilizing fins 15 extend substantially from the trailing edge of the wing A forwardly a distance over the upper surface of the wing and decrease in thickness forwardly until they substantially merge into the upper surface of wing A. These stabilizing fins 15 are located in planes spaced a distance inwardly from the vertical planes in which the roll stabilizing fins 12 are located, but these yaw or directional stabilizing fins are not limited or confined to any particular shape or form.

The inherent longitudinal or pitch stability of the low aspect ratio wing or body A is rendered more effective by the provision of a fixed horizontal stabilizing surface or surfaces, which in the specific examples of the design of aircraft of Fig. 1, comprise a rear horizontal stabilizing surface 16 and a forward stabilizing surface 17. The rear fixed horizontal stabilizing surface 16 in this instance happens to be mounted in the trailing portion of the wing A in a space or opening therein at the trailing portion of an air displacement passage which extends longitudinally through the wing and with the trailing edge of the stabilizer 16 substantially aligned with the trailing edge of the fixed trailing portion 11 of wing A. Stabilizer 16 is of a relatively thick airfoil section as clearly illustrated in Fig. 3 of the drawings. The forward stabilizing surface 17 is mounted in the forward or leading edge portion of the wing A, and in this instance, within a space in leading edge portion 10 which forms the intake or inlet opening for the air displacement passage through the airfoil.

Attention is directed to the fact that the locations and positions of the aforesaid stabilizing and control surfaces, both fixed and movable and whether vertical or horizontal, are not limited to the locations and positions as shown by full lines in Figs. 1, 2 and 3, but such stabilizing and/or control surfaces may be positioned at other locations or may be mounted and arranged for displacement horizontally and vertically to adjusted positions, as indicated for example in dotted lines in Fig. 3, in order to take advantage of particular aerodynamic flow conditions due to overall shapes, cambers and aspect ratio that may be employed in any particular design adaptations of the invention. Similarly the invention is not limited to the particular angles of attack shown or indicated for these various stabilizing and/or control surfaces in the example illustrated by the accompanying drawings.

The control of the aircraft formed by the wing A with the stabilizing surfaces as hereinbefore described, is accomplished through the medium of movable control surfaces for obtaining control in pitch, roll and yaw. The pitch control for the aircraft is obtained in this instance from a series, referring now to Fig. 1 of the drawings, of three (3) horizontal control surfaces 18, 18 and 19, with the two outer control surfaces 18 at opposite ends of the intermediate and centrally located control surface 19. These three surfaces are mounted for vertical angular displacement relative to the wing A, and any suitable or desired pilot control mechanism (not shown) is provided for simultaneously angularly deflecting the control surfaces 18, 18 and 19 in the same direction to establish pitching moments acting on the wing A in a desired direction for pitch control, or said surfaces may be deflected or displaced to establish moments acting in any other desired direction for control in roll and/or in yaw. It is to be noted that the intermediate control surface 19 is pivotally mounted to and along the trailing edge of the horizontal stabilizing surface 16 in rearward continuation of such surface to complete the airfoil section thereof. If desired the intermediate control surface 19 may be actuated independently of the opposite outer control surfaces 18 to function as the sole longitudinal or pitch control surface for the aircraft, with the function of the outer control surfaces 18 as pitch control surfaces being eliminated.

The roll control of the aircraft formed by the wing or body A is in the particular example here given, obtained by differential actuation of the opposite outer control surfaces 18 to vertically angularly deflect these surfaces simultaneously in opposite directions in order to develop roll moments acting on the aircraft in the desired direction. Any of the known or suitable mechanisms may be provided by which the surfaces 18 are differentially actuated while these surfaces are operable for pitch control, the arrangement of operating mechanism being the usual one in which the control surfaces 18 are differentially operable in any position to which these surfaces have been simultaneously moved in the same direction for pitch control.

Directional or yaw control of the aircraft of the form of Fig. 1 is obtained by vertical rudders 20 which are pivotally mounted along the trailing edges of the vertical stabilizing surfaces 15, as will be clear by reference to Figs. 1 and 3. Any suitable pilot operated control mechanism is provided for simultaneously angularly deflecting the surfaces 20 horizontally in the same direction in order to establish yawing moments acting in the desired direction for controlling the aircraft. A combination of the yaw control surface or surfaces 20 with the pitch control surface or surfaces 18 may be used for additional maneuvers or refinements of control in the pilot control and flight operation of the aircraft.

An aircraft formed by the low aspect ratio, relatively thick section wing or body designed in accordance with my invention is particularly adapted for the use of thrust augmentation means and methods for the propulsion of the aircraft, and my invention includes as features thereof the provision of an efficient form or type of thrust augmentation propulsion means and of the design, arrangement and mounting of such means in aerodynamic and structural association and coordination with the low aspect ratio wing or body and its arrangement of stabilizing and control surfaces. As an example of one mechanical and aerodynamic embodiment of such a propulsion means, I have shown the wing A of the aircraft of Fig. 1 of the drawings as having a passage P extending longitudinally through the wing A from the leading edge thereof to the rear or trailing portion of the airfoil. The leading edge portion of airfoil A has a central part of the leading edge 10 cut away inwardly to provide the inlet space or intake mouth of the passage P, while the central trailing portion of the airfoil A is cut away between the vertical stabilizing fins 15 to provide the space of opening 21 through the airfoil which forms the space into which the passage P opens and discharges. The stabilizing fin 16 is located in and extends substantially across and forwardly through this space 21 with the control surface 19 thereby subjected to the discharge air flow. Stabilizing surface 17 at the leading edge portion of airfoil A is located in and extending across the space 22 which is formed in the leading edge portion 10 of the airfoil and which provides the intake for the forward end of passage P.

Referring now particularly to Fig. 3 of the drawings, the shape and form of the passage P in accordance with the principles of the invention is clearly shown. The forward or inlet end portion of the passage P decreases rearwardly in diameter to provide restricted or reduced sectional area 23 which is located spaced rearwardly a distance from the inlet 22 for the passage. The passage P then gradually and symmetrically increases in diameter and cross sectional area rearwardly to the rear discharge end of the passage at the space 21 in the trailing portion of the wing A. Thus air flowing or discharging rearwardly through passage P passes through the constricted or reduced area portion 22 of the passage and flows with increased velocity from such constriction into the rearwardly extended and expanding portion of the passage P.

In the present example propellers 24 and 25 are mounted in the forward portion of the passage P for discharging air rearwardly through the passage from the forward or leading edge of the wing A rearwardly to the outlet end of the passage where the air is discharged rearwardly into the space 21 over and across the stabilizing surface 16 and the control surface 19. The propeller 24 is located at the forward inlet end of passage P and has a diameter substantially that of the internal diameter of the inlet end of the passage but with operating clearance and is suitably mounted for rotation about an axis coincident with the longitudinal axis of the passage. This propeller 24 is suitably designed for the air velocity and air movements required at its location for efficient operation. The propeller 25 is mounted within the passage P just to the rear of the constricted or smallest cross sectional area 23 of the passage P and this propeller 25 is differently designed from the propeller 24 in order to take care of and efficiently meet the conditions encountered as a result of the increased velocity air movement at such position in the passage P. The propeller 25 is of a diameter substantially that of the internal diameter of the passage at the location of the propeller 25, but with sufficient operating clearance for the propeller which is mounted for rotation about an axis coincident with the longitudinal axis of the passage P.

The air displacement passage P in accordance with my invention is so designed and arranged that the forward portion or section thereof provides a cone-like portion 30 decreasing in diameter rearwardly from its forward inlet end, to its discharge end at 23, and a rear cone-like section or portion 31 that increases in diameter rearwardly from its inlet end at 23 to its discharge end in the space 21. The design is such, referring now particularly to Fig. 10 of the drawings, that the forward section 30 of the passage P has substantial suction or negative pressures established therein and acting on the walls thereof as indicated by the arrows in Fig. 10, while the rear cone-like section or portion 31 of the passage P has substantial positive pressures established therein and acting on the wall thereof as indicated by the arrows applied to that section in Fig. 10. In other words the design and arrangement of the passage P is such that the lowest possible pressures will be established in and along the forward cone-like section 30 and the highest possible pressures will be established in and along the rear cone-like section or portion 31 of the passage P, so that the components of the pressures integrate in a forward direction to substantially increase the thrust at low and medium speeds of the aircraft.

Preferably with a wing or body of other than of symmetrical airfoil section, that is a wing having an airfoil section with a greater camber at one side thereof than at the other as in the examples of Figs. 8 and 9, the cone-like forward and rear sections 30 and 31 of the air displacement passage are arranged in an angular relationship to each other in the direction of that surface of the wing of greatest camber. For example, in Fig. 8 is diagrammatically shown a wing having an airfoil section with the upper surface of greater camber than the lower surface of the wing, and in accordance with the invention the forward and rear sections 30 and 31 of passage P are directed upwardly in angular relation to each other to join at the point 23 of smallest diameter which forms the restricted passage between the forward and rear sections of the displacement passage. Similarly, in Fig. 9 where a wing is shown having its lower surface of greater camber than its upper surface, the forward and rear sections 30 and 31 are inclined downwardly in angular relationship to each other to meet at the restricted passage 23. Whereas, in Fig. 10, and in the examples of Figs. 1 to 3, where the wing is of symmetrical section, the forward and rear sections 30 and 31 forming the passage P are preferably in axial alignment.

A further factor and a characteristic of the air displacement passage of the thrust augmentation means of my invention resides in the design of the forward intake or inlet end 22 of the air displacement passage P and this factor is particularly illustrated in Figs. 4 and 5 of the accompanying drawings. In accordance with this factor, the forward inlet or intake end of the passage P is formed by a vertically elliptical or elongated opening 32 formed through a leading edge portion of the wing A and of a width approximately equal to the diameter of the forward inlet end of the section 30 of the air displacement passage P, but with the opening preferably slightly decreasing in width toward its upper and lower ends. The height or vertical length of this opening or intake 32 is preferably of the order of 80% of the depth or thickness of the wing, although the invention is not limited or restricted to this exact percentage as the same may be varied to meet the conditions of each design adaptation.

By the arrangement of the passage P formed and shaped as described and with the propellers 24 and 25 of the design and character and located in the passage as specified, a highly efficient thrust force developing means is provided for propelling the aircraft with the thrust developed from the propellers 23 and 24 substantially augmented over the thrust possible to such propellers when mounted externally of the craft in free air. In operation the propellers 24 and 25 draw air into the forward end of the passage P from the air mass at the leading edge of the wing or body A and force and impel this air in a column rearwardly through passage P to the rear discharge end thereof. It is to be noted that this column of air being displaced rearwardly through passage P has a substantial stabilizing effect upon the aircraft formed by the wing A when in flight.

The thrust augmentation means and method of my invention as herein disclosed has the further important advantage of increasing the efficiency of the performance of the aircraft by eliminating interruptions and disturbances to the smoothness and continuity of the streamline airflow over and across the wing A, as will be clearly indicated by the arrows in Fig. 3 indicating the direction of airflow over the airfoil and into and through the displacement passage P. The stabilizing surface 17 at the inlet end of passage P and the stabilizing surface 16 at the rear or discharge end of the passage aid in maintaining smoothness of airflow into the passage and smoothness of discharge from the passage with the elimination of turbulence and resulting increase in the efficiency of the propellers 24 and 25. Similarly, the discharge airflow from the passage P reacting upon the airfoil section stabilizing surface 16 renders such surface more effective while the pitch control surface 19 operating in this airflow renders this surface effective with the wing A in flight or at slow speeds or zero horizontal translation.

Several preferred plan forms of low aspect ratio wings or bodies embodying my invention are purely schematically indicated in outline by Figs. 11 to 12, inclusive, of the accompanying drawings and in each instance the direction of flight for the wing or body illustrated is indicated by an arrow, so that in each instance the leading edge of the wing is at the upper side thereof in the drawings. Various other plan forms than those illustrated in Figs. 11 to 14 as well as various refinements of the illustrated forms may be employed within the scope of my present invention.

In connection with Figs. 5 and 7 of the drawings it is to be noted that the low aspect ratio wing or body A' is formed with a laterally cambered under surface a by which an inherent lateral or roll stability is obtained for this type of low aspect ratio wing or body.

My present invention is not concerned with the interior arrangement of the wing or body A but it is understood that a suitable source of power for driving the propellers 24 and 25 will be provided housed within wing A and attention is here also directed to the fact that the invention is not limited to the use of propellers as any other medium or element for impelling air through passage P and developing the desired thrust force may be utilized.

The aircraft will, of course, be provided with any suitable form of landing gear (not shown) and facilities for containing and carrying the necessary loads therewithin, including pilot facilities, but as none of the foregoing forms any part of my present invention it is deemed unnecessary to make any disclosures thereof herein.

It is also evident that various changes, modifications, variations, additions, substitutions, and eliminations may be resorted to without departing from the spirit and scope of my invention, and hence I do not intend or desire to limit my invention by or to the exact and specific disclosures hereof.

What I claim is:

1. An aircraft embodying a wing forming the primary structure for the aircraft, said wing being of a low aspect ratio of the order of approximately 1 to 1.27 and having a maximum thickness in the range of from approximately 12% to approximately 30% of the chord of the wing, means for propelling the aircraft, means for controlling the aircraft in flight in roll, in yaw and in pitch, the aircraft constituted by said primary structure-forming wing having its center of gravity located along the longitudinal axis of the aircraft at a point spaced rearwardly from the leading edge of the wing a distance approximately equal to approximately 30% of the chord of the wing, and means for stabilizing said aircraft in roll including vertically disposed surfaces located on the forward portion and extending chordwise of the wing from the leading edge portion rearwardly to and terminating forward of the intermediate portion of the wing, and said surfaces extending outwardly from the wing at the opposite end or tip portions of the wing, respectively.

2. An aircraft embodying a wing forming the primary structure for the aircraft, said wing being of a low aspect ratio of the order of approximately 1 to 1.27 and having a maximum thickness in the range of from approximately 12% to approximately 30% of the chord of the wing, means for propelling the aircraft, means for controlling the aircraft in flight in roll, in pitch and in yaw, the aircraft constituted by said primary structure-forming wing having its center of gravity located along the longitudinal axis of the aircraft at a point spaced rearwardly from the leading edge of the wing a distance approximately equal to approximately 30% of the chord of the wing, a system of roll stabilizing surfaces for said aircraft embodying vertically disposed surfaces located on the forward portion of said wing forward of the center of gravity of the aircraft and extending outwardly from the surface of the wing at the opposite end or tip portions of the wing, respectively, and control surfaces located to the rear of the center of gravity of said aircraft and being adapted for actuation to establish rolling moments for roll control of said aircraft in flight.

3. An aircraft embodying a wing of low aspect ratio constituting the primary structure of the aircraft, means for propelling said aircraft embodying an air displacement passage within and extending through said wing with the intake end of said passage opening through the leading edge portion and the discharge end of said passage opening through the trailing edge portion of said wing, means for displacing air rearwardly through said passage and for developing a thrust force for propelling the aircraft, a horizontally disposed stabilizing surface located within and extending substantially across the rear discharge end of said passage within the airflow through said passage for stabilizing said aircraft in pitch, and a horizontally disposed stabilizing surface located within and extending substantially across the forward intake end of said air displacement passage within the airflow at the intake end of the said passage.

4. An aircraft embodying a wing of low aspect ratio constituting the primary structure of the aircraft, means for propelling said aircraft embodying an air-displacement passage within and extending through said wing in the normal direction of flight, the said air-displacement passage having its forward intake end opening through the leading edge portion and its rear discharge end opening through the trailing edge portion of said wing, means associated with said passage for displacing air rearwardly therethrough and for developing a thrust force for propelling the aircraft, a horizontally disposed stabilizing surface located within and extending substantially across the rear discharge end of said passage within the airflow therethrough for stabilizing said aircraft in pitch, said rear pitch stabilizing surface being adapted for vertical displacement to adjusted positions within and relative to said air-displacement passage and the airflow therethrough, and a horizontally disposed stabilizing and controlling surface located within and extending substantially across the forward intake end of said passage, within the airflow therethrough, and the said forward stabilizing and controlling surface being adapted for vertical displacement to adjusted angular positions relative to the airflow into and rearwardly through the forward intake end of said passage.

5. In an aircraft, a lift developing structure of airfoil section having a low aspect ratio, and means for propelling the aircraft embodying an air displacement passage within and extending rearwardly through said structure with the forward intake end of said passage opening through the leading edge portion of the structure and with the rear discharge end of said passage opening through the trailing portion of said structure, said passage being formed to provide a forward section and a rear section with the rear end of the forward section joined and in communication with the forward end of the rear section, said forward section progressively decreasing in diameter from its forward end rearwardly throughout its length to the rear end of said section, said rear section progressively increasing in diameter rearwardly from its forward end throughout its length to the rear discharge end of said section, and means for developing a thrust force and for displacing air rearwardly through the said displacement passage formed by said forward and rear sections, whereby a substantial suction or negative pressure is established in and substantially throughout the length of said forward section and a substantial positive pressure is established in and substantially throughout the length of said rear section.

6. In an aircraft, a lift developing structure of airfoil section and of low aspect ratio, said lift developing structure constituting the primary structure of the aircraft, and means for developing a thrust force for propelling the aircraft embodying; an air displacement passage formed within and extending rearwardly through said lift developing structure with the forward air inlet end of said passage opening through the leading edge of the said lift developing structure and with the rear air discharge end of said passage opening through the trailing portion of the said structure, said air displacement passage being formed by a forward section and a rear section, the said forward section of said passage decreasing in diameter rearwardly from the forward end of the section to the forward end of the rear section with which it is in communication, the said rear section of said passage increasing in diameter rearwardly from the reduced diameter rear end of the forward section to the discharge end of said passage through the trailing portion of such structure, a propeller mounted in said forward section at the air inlet end of said passage within the confines of said lift developing structure, and a propeller mounted in the rear section of said air-displacement passage at the forward reduced diameter end thereof immediately to the rear of the reduced diameter rear end of said forward section of said passage, the said propellers adapted to draw air into said passage through the forward inlet end thereof and to force and displace air rearwardly through said passage for discharge therefrom outwardly through the rear air discharge opening of said passage in the trailing portion of said lift developing structure.

7. An aircraft formed by a wing of low aspect ratio and having a maximum thickness in the range of from approximately 12% to approximately 30% of the chord of the wing, said wing constituting the primary structure of the aircraft and having an air-displacement passage therewithin extending rearwardly therethrough with the forward end of said passage located at the leading portion of the wing and the rear end of said passage opening through the trailing edge portion of the wing, the leading edge of the wing being formed with an air inlet opening therethrough in communication with and discharging into the forward end of said air-displacement passage, said air inlet opening through the leading edge of said wing having a length vertically of approximately at least 80% of the maximum thickness of said wing and having a width horizontally approximating the diameter of the forward end of said air displacement passage, and means in said air displacement passage for forcing displacement of air rearwardly therethrough to develop a thrust force for propelling the aircraft.

8. An aircraft formed by a wing of low aspect ratio of the order of 1 to 1.27 and having a maximum thickness factor in the range of from twelve percent (12%) to thirty percent (30%) of the chord of the wing, said wing being formed with an air displacement passage therewithin extending rearwardly therethrough from the leading edge portion to the trailing edge portion of the wing, said air-displacement passage being formed by a forward section and a rear section, said forward section having its forward intake end located at the leading edge portion of the wing and decreasing in diameter rearwardly to the forward end of the rear section, said rear section being extended rearwardly from the reduced diameter rear end of the forward section to and opening through the trailing edge portion of the wing for discharge of air outwardly therethrough from said passage, said rear section increasing in diameter rearwardly from the reduced diameter rear end of said forward section to the discharge opening thereof at the trailing edge of the wing, and the leading edge of said wing being formed with an air intake opening therethrough in communication with the forward intake end of the forward section of said passage, said leading edge air intake opening having a length vertically of the order of approximately eighty percent (80%) of the maximum depth of the wing and having a width horizontally approximating the diameter of the forward intake end of the forward section of said air-displacement passage.

9. An aircraft embodying a wing of low aspect ratio constituting the primary structure of the aircraft, vertical surfaces for stabilizing said low aspect ratio wing in roll, each of said stabilizing surfaces being located at the forward portion and extending chordwise of the wing from the leading edge portion rearwardly to and terminating forward of the intermediate portion of the wing, and said roll stabilizing surfaces being substantially parallel to each other and extending outwardly from the wing at the opposite end or tip portions, respectively, of the wing.

10. An aircraft embodying a wing of low aspect ratio constituting the primary structure of the aircraft, vertical surfaces for stabilizing said low aspect ratio wing in roll, each of said stabilizing surfaces being located at the forward portion and extending chordwise of the wing from the leading edge portion rearwardly to and terminating forward of the intermediate portion of the wing, said roll stabilizing surfaces being substantially parallel to each other and extending outwardly from the wing at the opposite end or tip portions, respectively, of the wing, a horizontally disposed surface at the trailing portion of the wing and being adapted to be vertically displaced to establish pitching moments, and roll control surfaces located at the trailing portion of said wing at opposite sides of said horizontally disposed surface, said roll control surfaces being adapted for vertical displacement for developing rolling moments for laterally controlling the aircraft.

11. An aircraft embodying a wing of low aspect ratio constituting the primary structure of the aircraft, vertical surfaces for stabilizing said wing in roll, each of said stabilizing surfaces being located at the forward portion and extending chordwise of the wing from the leading edge portion rearwardly to and terminating forward of the intermediate portion of the wing, said roll stabilizing surfaces being substantially parallel to each other and extending outwardly from the wing at the opposite end or tip portions, respectively, of the wing, and roll control surfaces at the trailing portion of the wing adapted for differential displacement to develop rolling moments acting in the desired direction for laterally controlling the aircraft.

12. An aircraft comprising a wing of low aspect ratio constituting the primary structure of the aircraft, vertical surfaces for stabilizing said wing in roll, each of said stabilizing surfaces being located at the forward portion and extending chordwise of the wing from the leading edge portion rearwardly to and terminating forward of the intermediate portion of the wing, said roll stabilizing surfaces being substantially parallel to each other and extending outwardly from the wing at the opposite end or tip portions, respectively, of the wing, a horizontally disposed surface for stabilizing said wing in pitch disposed at the trailing portion of the wing, a pitch control surface mounted on the trailing portion of said pitch stabilizing surface and adapted to be vertically angularly displaced for establishing pitching moments acting in a desired direction for pitch control, control surfaces located at the trailing portion of said wing at opposite sides of said pitch stabilizing surface and being adapted for vertical displacement for developing rolling moments for laterally controlling the aircraft, and a horizontally disposed control surface mounted at and extending forwardly from the leading edge portion of said wing and being adapted for vertical angular displacement.

13. An aircraft embodying a wing of low aspect ratio constituting the primary structure of the aircraft, means for propelling said aircraft embodying an air displacement passage extending through said wing with its intake end opening through the leading edge portion and its discharge end opening through the trailing edge portion of said wing, means disposed in said passage for displacing air rearwardly through said wing, a horizontally disposed control surface at and extending substantially across the discharge end of said passage within the air flow therethrough, a horizontally disposed control surface disposed at and extending substantially across the intake end of said passage within the air flow thereinto, vertical surfaces for stabilizing said wing in roll, each of said roll stabilizing surfaces being located in the forward portion and extending chordwise of the wing from the leading edge portion rearwardly to and terminating forward of the intermediate portion of the wing, said roll stabilizing surfaces extending outwardly from the wing at the opposite end or tip portions, respectively, of the wing, roll control surfaces at the trailing portion of the wing adapted for displacement to develop rolling moments acting in the desired direction for laterally controlling the aircraft, vertical surfaces disposed chordwise of the wing extending outwardly at the trailing portion thereof at opposite sides of the rear discharge end of said displacement passage for stabilizing the aircraft in yaw, and vertically disposed control surfaces located at the trailing portion of the wing and adapted to be horizontally displaced for establishing yawing moments for directionally controlling the aircraft.

14. An aircraft embodying a wing of low aspect ratio constituting the primary structure of the aircraft, an arrangement of stabilizing surfaces for stabilizing said aircraft in roll, consisting of vertical surfaces located at the forward portion and extending chordwise of the wing from the leading edge portion rearwardly to and terminating forward of the intermediate portion of the wing and extending upwardly from the upper surface of the wing at opposite end or tip portions, respectively, of the wing, and vertical surfaces located at the forward portion and extending chordwise of the wing from the leading edge portion rearwardly to and terminating forward of the intermediate portion of the wing and extending downwardly from the under surface of the wing at the oppostie end or tip portions, respectively, of the said wing.

15. An aircraft embodying a wing of low aspect ratio, constituting the primary structure of the aircraft, means for propelling said aircraft embodying, an air displacement passage within and extending through said wing with the intake of said passage opening through the leading edge portion and the discharge end of said passage opening through the trailing edge portion of said wing, means for displacing air rearwardly through said passage, a horizontally disposed control surface located within and extending substantially across the rear discharge end of said passage within the air flow through said passage, said control surface being adapted for vertical displacement relative to the passage, and a horizontally disposed control surface located within and extending substantially across the forward intake end of said air displacement passage within the air flow at the intake end of the said passage, and the said control surface located in the forward intake end of said passage being adapted for vertical displacement relative to said passage.

16. An aircraft embodying a wing of low aspect ratio constituting the primary structure of the aircraft, means for propelling said aircraft including, an air displacement passage having an intake end opening through the leading edge portion of said wing, a horizontally disposed control surface located within and extending substantially across the intake end of said displacement passage within the air flow thereinto, said control surface being adapted for vertical displacement within and relative to the intake end of said passage, an air discharge opening through the trailing end portion of said wing for rearward displacement of air outwardly therethrough, and a horizontally disposed control surface located within and extending substantially across said discharge opening within the air flow therethrough, and said control surface located within the discharge end of said passage being adapted for vertical displacement relative to said discharge opening.

17. An aircraft embodying a wing of low aspect ratio constituting the primary structure of the aircraft, an arrangement of stabilizing surfaces for stabilizing said aircraft in roll, consisting of vertical surfaces located at the forward portion and extending chordwise of the wing from the leading edge portion rearwardly to and terminating forward of the intermediate portion of the wing, said stabilizing surfaces extending outwardly from the surface of the wing at opposite end or tip portions, respectively, of the wing, and each of said surfaces being spaced inwardly from the outer edge of the adjacent tip portion of the wing.

18. In an aircraft, a lift developing structure of low aspect ratio and of airfoil section constituting a wing having a greater camber at one major lift developing surface thereof than at the opposite major lift developing surface thereof, said wing being formed with an air-displacement passage therewithin extending rearwardly therethrough from the leading edge portion to the trailing edge portion of the wing with the forward intake end of said passage opening through the leading edge portion of the wing and with the rear discharge end of said passage opening through the trailing portion of the wing, said air-displacement passage being formed by a forward section and a rear section with the forward section decreasing in diameter rearwardly from the forward intake end of said passage and with the rear section thereof increasing in diameter rearwardly from the rear end of the forward section to the discharge end of said passage, the said forward section of said passage being disposed in position with its longitudinal axis inclined upwardly and rearwardly from the forward inlet end of said passage to the forward intake end of said rear section, and the said rear section being disposed in position with its longitudinal axis inclined downwardly and rearwardly to the rear discharge end of said passage.

19. In an aircraft, a lift developing structure of low aspect ratio and of airfoil section forming a wing constituting the primary structure of the aircraft, said wing being formed with an air-displacement passage therewithin extending rearwardly therethrough from the leading edge portion to the trailing edge portion of the wing with the forward intake end of said passage opening through the leading edge portion of the wing and with the rear discharge end of said passage opening through the trailing portion of the wing, said air-displacement passage being formed by a forward section and a rear section with the forward section decreasing in diameter rearwardly from the forward intake end of said passage and with the rear section increasing in diameter rearwardly from the rear end of the forward section to the discharge end of said passage, and the said forward section of said passage being positioned with its longitudinal axis inclined upwardly and rearwardly from the forward inlet end of said passage to the forward end of said rear section and the said rear section being positioned with its longitudinal axis inclined downwardly and rearwardly from the rear end of said forward section to the rear discharge end of said passage, and the said wing forming lift developing structure having the upper surface thereof of greater camber than the lower surface thereof.

LOUIS H. CROOK.